United States Patent [19]

Horigome et al.

[11] Patent Number: 4,651,559

[45] Date of Patent: Mar. 24, 1987

[54] METHOD AND APPARATUS FOR DETECTING LEAKS IN A GAS PIPE LINE

[75] Inventors: Hidekazu Horigome; Takahiro Onishi, both of Yokohama; Makoto Yamagishi, Kawasaki, all of Japan

[73] Assignee: Nippon Kokan Kabushiki Kaisha, Tokyo, Japan

[21] Appl. No.: 812,622

[22] Filed: Dec. 23, 1985

[30] Foreign Application Priority Data

Dec. 25, 1984 [JP] Japan ................................ 59-275255
Dec. 25, 1984 [JP] Japan ................................ 59-275256

[51] Int. Cl.⁴ .............................................. G01M 3/28
[52] U.S. Cl. ................................................ 73/40.5 R
[58] Field of Search ....................... 73/40.5 R; 364/510

[56] References Cited

U.S. PATENT DOCUMENTS

| | | | |
|---|---|---|---|
| 3,105,882 | 10/1963 | Meyer | 73/40.5 R X |
| 3,105,883 | 10/1963 | Higson, Jr. | 73/40.5 R X |
| 4,306,446 | 12/1981 | Fukuda | 73/40.5 R |
| 4,308,746 | 1/1982 | Covington | 73/40.5 R |

FOREIGN PATENT DOCUMENTS

| | | | |
|---|---|---|---|
| 2603715 | 8/1977 | Fed. Rep. of Germany | 73/40.5 R |
| 100730 | 6/1983 | Japan | 73/40.5 R |
| 211100 | 12/1983 | Japan | 73/40.5 R |

Primary Examiner—Stewart J. Levy
Assistant Examiner—Joseph W. Roskos
Attorney, Agent, or Firm—Fleit, Jacobson, Cohn & Price

[57] ABSTRACT

A method and apparatus for measuring a gas pressure gradient in each of the upstream and downstream parts of a gas pipe line and detecting a leak in the gas pipe line in accordance with the pressure gradients. When a gas leak occurs, the gas pressure at the position of the leak is decreased and at least the pressure gradient upstream of this position is increased. When the difference between the upstream pressure gradient and the downstream pressure gradient is greater than a predetermined value, the occurrence of a gas leak is determined. Also, the occurrence of a gas leak is determined when each of the displacement of the upstream pressure gradient and the displacement of the downstream pressure gradient attains a predetermined relation.

4 Claims, 10 Drawing Figures

PRESSURE GAUGE 2A, 2B, 2C, 2D, 2E
GAS PIPE LINE 1

GAS PRESSURE P
$S_1$ $S_2$ $S_3$ $S_4$ $S_5$
DISTANCE L

PRESSURE CONTROL VALVE 3
GAS LEAK POINT 5
PRESSURE CONTROL VALVE 4

METHOD AND APPARATUS FOR DETECTING LEAKS IN A GAS PIPE LINE

BACKGROUND OF THE INVENTION

The present invention relates to a gas pipe line leakage detecting method and apparatus for detecting gas leaks in a gas pipe line.

While various leak detecting methods have been proposed in the past for use with liquid transmission pipe lines, there exist the following considerable differences between the liquid transmission pipe line and the gas pipe line and therefore the hitherto proposed leak detecting methods for liquid transmission pipe lines cannot be applied as such to the gas pipe line.

Firstly, gas is a compressible fluid and therefore the line packing quantity of the gas within the pipe line is subject to dynamic variations. Thus, there occur the following phenomena which are not encountered in the liquid pipe line. For instance, a considerable time is required before the effect of a change in the pressure, flow rate or the like at one end appears at the other end. Moreover, the effect reaches in a considerably weakened form at the other end due to the attenuation and diffusion of the effect during its propagation through the pipe line. Of course, it is impossible to produce synchronization between the two events and also the effect does not simply appear at the other end with a given time delay.

Next, a change in the pressure, flow rate or the like due to the occurrence of a leak is much smaller than in the case of a liquid and the attenuation is also so large that it is extremely difficult to distinguish the change from various variations which always occur during the ordinary operation. Also, the propagation time of the change is extremely slow as compared with that of the liquid.

In view of these facts, the detection of a gas leak has been effected by the following methods.

The conventional methods have been mainly of the type which effects the detection of a gas leak by the use of a gas detector including a sensor to directly sense a leaked gas component, and it has been the usual practice that the gas detector is arranged at a place having a high probability of a leaked gas. In the case of a yard, the gas detector is mounted within the valve house; in the case of a gas pipe line a patrol car equipped with the gas detector makes the round for monitoring purposes. Also, a report has been made of a method in which a sound generated at a leak site by a leakage gas is picked up by a portable microphone.

From the operation standpoint of a gas pipe line, the usual practice is such that the pressure is measured at the dispatching base, destination base or midway point of the pipe line and compared with its predetermined upper and lower limit values, thereby indirectly determining the occurrence of a leak upon detection of an abnormal condition, and generally only the detection of large leakage is possible. Also, the predetermined values are frequently dependent on the personal experience of the operator himself and they are not universal, thus frequently tending to cause an error.

Further, all of the conventional methods are disadvantageous in that they are capable of effecting only a localized monitoring and they are incapable of continuously monitoring the gas pipe line over its whole extent.

SUMMARY OF THE INVENTION

The present invention has been made to overcome the foregoing deficiencies in the prior art, and it is an object of the invention to provide a leak detecting method and apparatus for a gas pipe line capable of detecting positively a gas leak in the gas pipe line.

It is another object of the invention to provide a leak detecting method and apparatus for a gas pipe line in which the difference in pressure gradient between the upstream part and the downstream part of the pipe line is measured, thereby detecting the occurrence of a gas leak.

It is still another object of the invention to provide a leak detecting method and apparatus for a gas pipe line in which the difference in pressure gradient with time is obtained in the upstream part and the downstream part, respectively, of the gas pipe line, thereby detecting the occurrence of a gas leak.

It is still another object of the invention to provide a leak detecting method and apparatus for a gas pipe line in which the gas pipe line is divided into a plurality of sections, and the detection of a gas leak in each section is performed at intervals of a predetermined time.

It is still another object of the invention to provide a leak detecting method and apparatus for a gas pipe line in which a pressure control valve is provided at the upstreammost part of the gas pipe line, and a pressure control valve or a flow control valve is provided at its downstreammost part thereby effecting the detection of a gas leak in the gas pipe line therebetween.

In accordance with one aspect of the invention, a plurality of pressure gages are arranged at given intervals on a gas pipe line whereby in any given section of the pipe line including three or four of the pressure gages, the pressure gradients in the upstream and downstream parts are obtained from the measured values of the pressure gages. If a gas leak occurs in the gas pipe line, centering around the position of the leak, the pressure gradient in the upstream pipe system is increased and the pressure gradient in the downstream pipe system is decreased thus causing the overall pressure gradient to take a downwardly bent convex form. Thus, the pressure gradient in the upstream art is compared with the pressure gradient in the downstream part so that the occurrence of a gas leak is determined when the resulting difference is greater than a predetermined value.

In accordance with another aspect of the invention, since the occurrence of a gas leak midway in the gas pipe line causes the pressure gradient in the upstream pipe system to increase with time and the pressure gradient in the downstream pipe system to decrease with time, as mentioned previously, the difference in pressure gradient between any given time and a time after a predetermined elapsed time is obtained in the upstream part and the downstream part, respectively. Then, the occurrence of a gas leak is determined when the difference for the upstream part is smaller than a predetermined value and the difference for the downstream part is greater than a predetermined value.

In accordance with still another aspect of the invention, the whole length of a gas pipe line is divided into a plurality of sections and the occurrence of a gas leak in each section is detected at predetermined intervals by any of the previously mentioned methods.

In accordance with still another aspect of the invention, a pressure control valve is provided at the upstreammost part of a gas pipe line and a pressure control valve or a flow control valve is provided at the downstreammost part of the gas pipe line, whereby the gas pressure gradient becomes more apparent upon occurrence of a gas leak and the gas leak is detected with a high degree of accuracy.

Thus, in accordance with the invention, by measuring pressure gradient changes inevitable to the occurrence of a gas leak in a gas pipe line, the whole extent of the pipe line can be monitored continuously, and the occurrence of a gas leak can be detected accurately as compared with the conventional methods. Moreover, the invention is advantageous in that the position of a gas leak can be confirmed in any given section of a gas pipe line.

Other objects and advantages of the invention will be apparent from the following description, the appended claims and the accompanying drawings.

DESCRIPTION OF THE PREFERRED EMBODIMENTS

Figure 1:
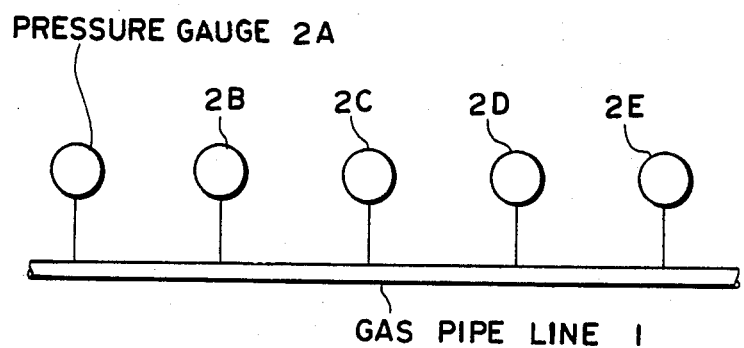
FIG. 1 is a schematic diagram of a gas pipe line showing an embodiment of the invention.

As shown in FIG. 1, a gas pipe line 1 for conveying a gas includes pressure gages 2A to 2E arranged at predetermined intervals.

Figure 2:
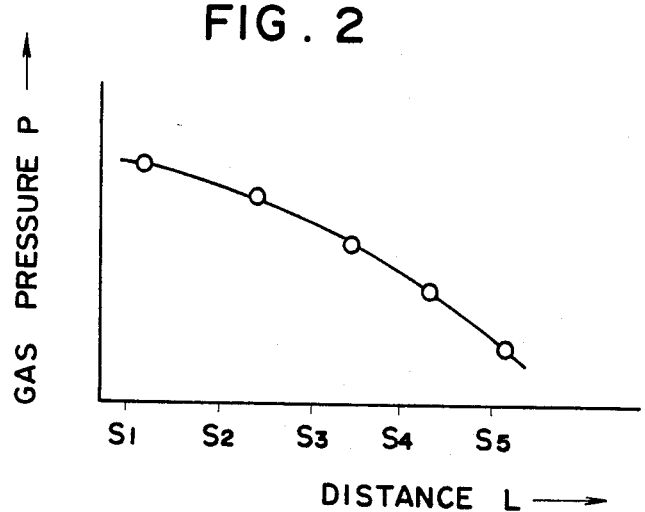
FIG. 2 is a graph showing the gas pressures at various points in the gas pipe line.
Figure 3:
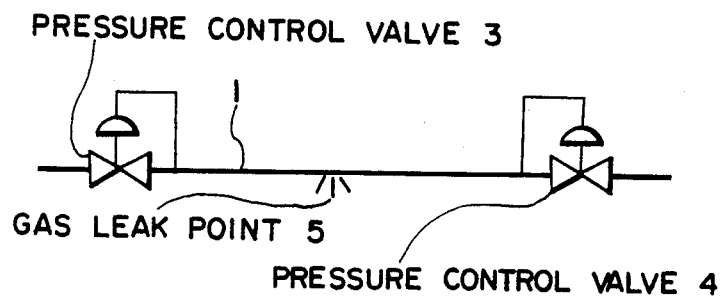
FIG. 3 is a schematic diagram showing the arrangement of pressure control valves or flow control values on the gas pipe line.

FIG. 2 is a graph showing the pressures P at measuring points $S_1$ to $S_5$ in the gas pipe line 1, in which the abscissa represents the distance L of the gas pipe line 1 and the ordinate represents the pressure within the gas pipe line 1. From this graph it will be seen that in the nonleaky condition where the gas is flowing normally, the gas pressure decreases from the inlet end toward the outlet end describing an upward convex curve.

Then, with pressure control valves 3 and 4 arranged respectively at the inlet and outlet ends of the gas pipe line 1, a consideration will be made of a condition in which there is a gas leak point 5 between the pressure control valves 3 and 4.

Figure 4:
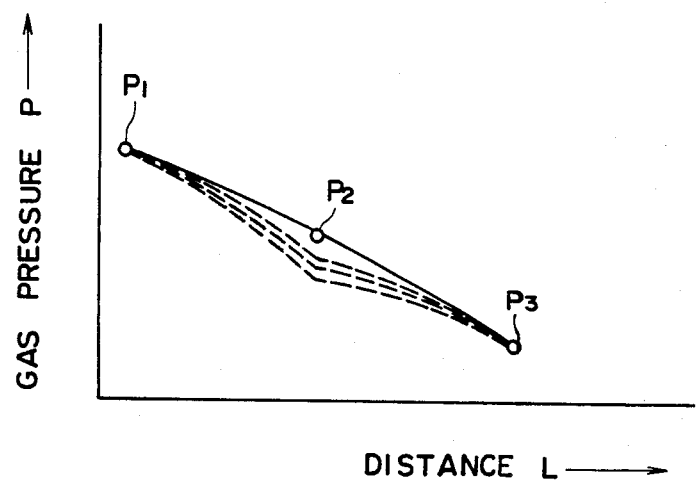
FIG. 4 is a graph showing the pressure distributions and their variations under gas nonleaky conditions and gas leaky conditions of the gas pipe line that includes a pressure control valve at the gas inlet and outlet ends.

FIG. 4 is a graph showing the variations of the gas pressure at various points with the gas leaking at the gas leak point 5 in the gas pipe line 1, with the abscissa representing the distance L of the gas pipe line 1 and the ordinate representing the pressure in the gas pipe line 1. In the graph, the solid line shows the pressure distribution in a gas nonleaky condition, and the broken lines show the pressure distribution and its variations with time in a gas leaky condition. Namely, it will be seen from the graph that the pressure decreases the most at the gas leak point 5 and there is a difference in pressure gradient between the upstream side and the downstream side as compared with the nonleaky condition.

Figure 5:
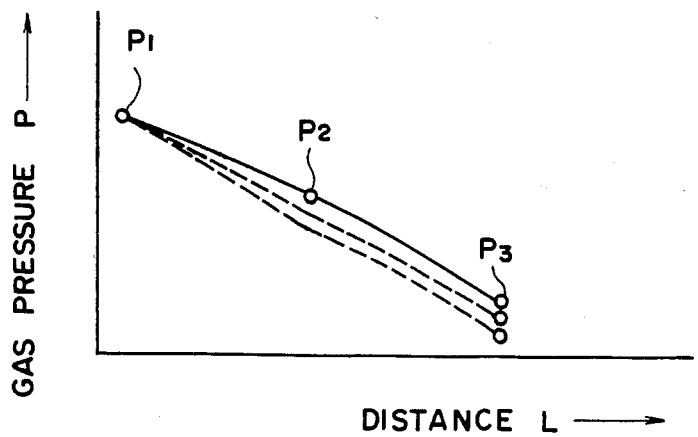
FIG. 5 is a graph similar to FIG. 4 for the gas pipe line including a flow control valve provided at the gas outlet end.

FIG. 5 is a graph similar to FIG. 4 showing the case in which there is a leak in the gas pipe line 1 and a flow control valve is used in place of the pressure control valve 4 of FIG. 4. It will be seen that on the upstream side the pressure gradient differs from that in the nonleaky condition, while on the downstream side the pressure gradient is not so different from that in the nonleaky condition.

Figure 6:
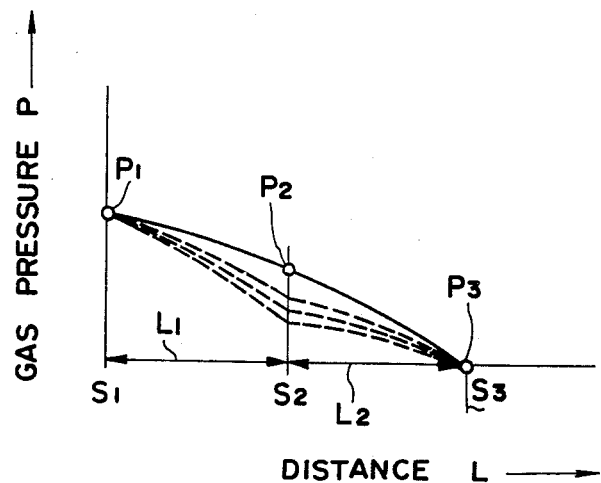
FIGS. 6 and 7 are diagrams for explaining expressions to represent the gas pressure gradients in the gas pipe line.

FIG. 6 is a diagram for explaining the manner of expressing the pressure gradients of the gas in the gas pipe line 1 by means of expressions. In the Figure, symbols $S_1$ to $S_3$ designate measuring points in a given section of the gas pipe line 1, that is, $S_1$ represents an upstream measuring point, $S_3$ represents a downstream measuring point and $S_2$ represents a leak point. Symbol $L_1$ designates the subsection between the measuring points $S_1$ and $S_2$ and $L_2$ designates the subsection between the measuring points $S_2$ and $S_3$. Also, symbols $P_1$ to $P_3$ designate the pressure at the measuring points $S_1$ to $S_3$, respectively, in an exemplary case in which a pressure control valve is provided at the gas outlet end, with the solid line showing the pressure distribution in a gas nonleaky condition and the broken lines showing the pressure distributions in a gas leaky condition.

The pressure gradients in the subsections $L_1$ and $L_2$ of the gas pipe line 1 can be given by the following expressions.

$$L_1: \frac{P_1 - P_2}{L_1} \quad (1)$$

$$L_2: \frac{P_2 - P_3}{L_2} \quad (2)$$

Then, in the nonleaky condition where the flow of the gas is normal, as will be seen from the solid line portion of the graphs of FIGS. 4 and 6 the pressure decreases from the point $S_1$ toward the point $S_3$, describing an upward convex curve so that the subsection $L_2$ is greater in pressure gradient than the subsection $L_1$.

Then, if the gas leaks at the point $S_1$, as will be seen from the dashed line portions of the graphs of FIGS. 4 and 6, there results a difference in pressure gradient between the subsections $L_1$ and $L_2$.

Thus, by obtaining the difference in pressure gradient between the subsections $L_1$ and $L_2$, it is possible to detect the occurrence of a gas leak in the given section of the gas pipe line 1.

The difference in pressure gradient between the subsections $L_1$ and $L_2$ is given by the following expression $$\frac{P_1 - P_2}{L_1} - \frac{P_2 - P_3}{L_2} > A_1 \quad (3)$$

where $A_1$ is an allowance determined in consideration of the dynamics of the gas pipe line.

It will be seen from the expression (3) that when the difference in pressure gradient between the subsections $L_1$ and $L_2$ is greater than the allowance $A_1$, it is an indication that there is a gas leak in the section $S_1$-$S_3$ and the amount of gas leakage increases with an increase in the pressure gradient difference.

Figure 7:
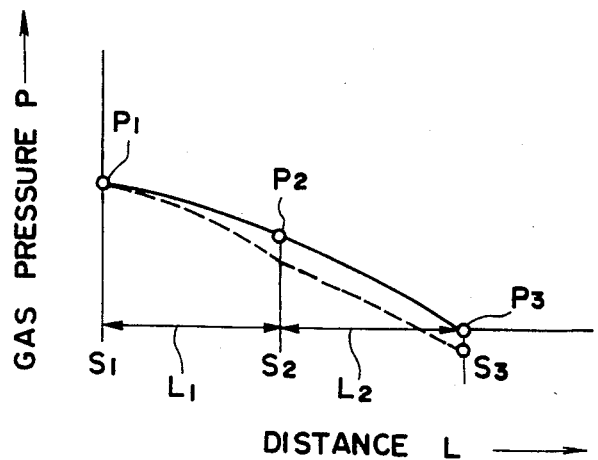

FIG. 7 is a diagram for representing the pressure gradient of the gas in the gas pipe line in which a flow control valve is provided at the gas outlet end. Also, in this case, the pressure gradient varies considerably in the subsection $L_1$ and the presence or absence of a gas leak is determined in accordance with the expression (3).

Also, since the pressure gradients vary with time as shown in FIGS. 6 and 7, the presence or absence of a gas leak may be determined similarly by measuring the pressure gradients with time.

Since the occurrence of a gas leak is determined when there exists, as mentioned previously, a difference in pressure gradient between any given time and a time after a predetermined elapsed time in each of the subsections $L_1$ and $L_2$, by obtaining the difference in pressure gradient between the given time and the time after a predetermined elapsed time in each of the subsections, it is possible to detect the occurrence of a gas leak in the section.

Thus, the difference in pressure gradient between any given time $t_o$ and a time after a predetermined elapsed time $t_1$ in the subsection $L_1$ is given by the following expression $$\frac{P_1(t_o) - P_2(t_o)}{L_1} - \frac{P_1(t_1) - P_2(t_1)}{L_1} < A_2 \qquad (4)$$

where $A_2$ is an allowance determined in consideration of the dynamics of the gas pipe line.

Also, the difference in pressure gradient between the given time $t_o$ and the time after the predetermined elapsed time $t_1$ in the subsection $L_2$ is given by the following expression $$\frac{P_2(t_o) - P_3(t_o)}{L_2} - \frac{P_2(t_1) - P_3(t_1)}{L_2} \geqq A_3 \qquad (5)$$

From the expressions (4) and (5) it will be seen that if there is a condition that the difference between the pressure gradient at any given time and the pressure gradient at a time after a predetermined elapsed time in the subsection $L_1$ is smaller than $A_2$, and the difference between the pressure gradient at the given time and the pressure gradient at the time after a predetermined elapsed time in the subsection $L_2$ is greater than or equal to $A_3$, the occurrence of a gas leak in the section $S_1$-$S_3$ is detected and also the amount of gas leakage increases with an increase in the absolute values of the pressure gradient differences.

Figure 8:
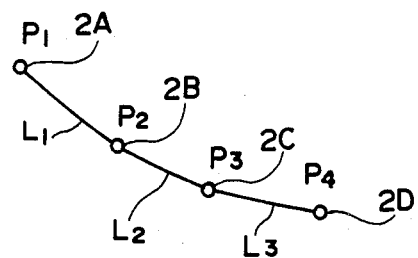
FIG. 8 is a diagram for explaining the detection of gas pressure gradients by the method of the invention using four pressure gages.

As regards the method of comparing pressure gradients, four pressure gages may be used as in FIG. 8, so that by using the pressure gradient of pressures $P_1$ and $P_2$ between upstream pressure gages 2A and 2B and the pressure gradient of pressures $P_3$ and $P_4$ between downstream pressure gages 2C and 2D and performing such calculations as mentioned previously, it is possible to detect with greater accuracy the occurrence of a leak within a subsection $L_2$ located between these pressure gradients. In whatever manner the valve is provided, a gas leak can be detected by these systems. Usually, a gas pipe line of this type is provided with such control valves.

Figure 9:
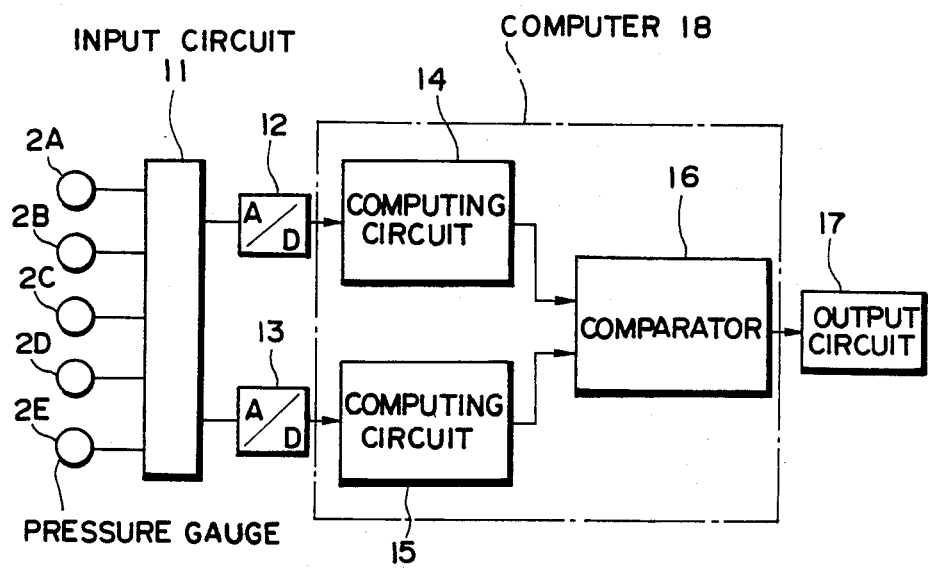
FIG. 9 is a block diagram showing an embodiment of a gas leak detecting apparatus according to the invention.

FIG. 9 is a block diagram of a gas leak detecting apparatus according to an embodiment of the invention.

The gas leak detecting apparatus generates a gas leak signal by detecting and computing the difference between pressure gradients in any given section of a gas pipe line 1.

In the Figure, five pressure gages 2A to 2E are arranged at predetermined intervals on the gas pipe line 1 and their measured outputs are applied to an input circuit 11. The measured values applied to the input circuit 11 are converted from analog signals to digital signals by A/D converters 12 and 13, respectively. The outputs of the A/D converters 12 and 13 are respectively applied to computing circuits 14 and 15 which in turn compute the pressure gradients of the gas. The outputs of the computing circuits 14 and 15 are then applied to a comparator 16 which in turn determines the presence or absence of a gas leak. The result of the determination is sent to an output circuit 17 which in turn generates an output indicative of the result. The computing circuits 14 and 15 and the comparator 16, can be provided by a computer 18.

The operation of this gas leak detecting apparatus will now be described. The pressure gages 2A to 2E are respectively arranged at measuring points $S_1$ to $S_5$ in the gas pipe line 1 (FIG. 1). Then, if, for example, a gas leak occurs at any one of the measuring points $S_1$ to $S_5$ in any given section of the gas pipe line 1, that is, at the measuring point $S_2$ between the measuring points $S_1$ and $S_3$, the input circuit 11 selects this section so that the measured pressure values from the pressure gages 2A and 2B at the measuring points $S_1$ and $S_2$ are applied as analog signals to the A/D converter 12. The measured pressure values from the pressure gages 2B and 2C at the measuring points $S_2$ and $S_3$ are applied as analog signals to the other A/D converter 13. The A/D converters 12 and 13 respectively convert the analog signals to digital signals and send the digital signals to the computing circuits 14 and 15. The computing circuit 14 computes the gas pressure gradient between the measuring points $S_1$ and $S_2$ in accordance with the previously mentioned expression (1) and the other computing circuit 15 computes the gas pressure gradient between the measuring points $S_2$ and $S_3$ in accordance with the expression (2). The pressure gradient values computed by the computing circuits 14 and 15 are sent to the comparator 16 so that the comparator 16 determines whether there is a gas leak in the section between the measuring points $S_1$ and $S_3$ in accordance with the expression (3), and a leakage signal is sent to the output circuit 17 when there is a gas leak. The output circuit 17 generates a signal which indicates the presence or absence of a leak to the outside and the indication signal is displayed in the form of a numerical value, symbol or the like on a suitable display. It is to be noted that the magnitude of the leakage signal sent to the output circuit 17 is increased with an increase in the amount of leakage gas and this permits a judgement of the degree of the leakage to some extent.

While, in this embodiment, the measuring positions of the given section are limited to the points $S_1$ to $S_3$ it is of course possible to arrange the gase leak detecting apparatus shown in FIG. 9 so that the input circuit 11 suitably selects, for example, the measuring points "$S_2$ to $S_4$", "$S_3$ to $S_5$", "$S_1$, $S_3$ and $S_5$", or the like, so as to detect the occurrence of a gas leak in any given section of the gas pipe line.

Figure 10:
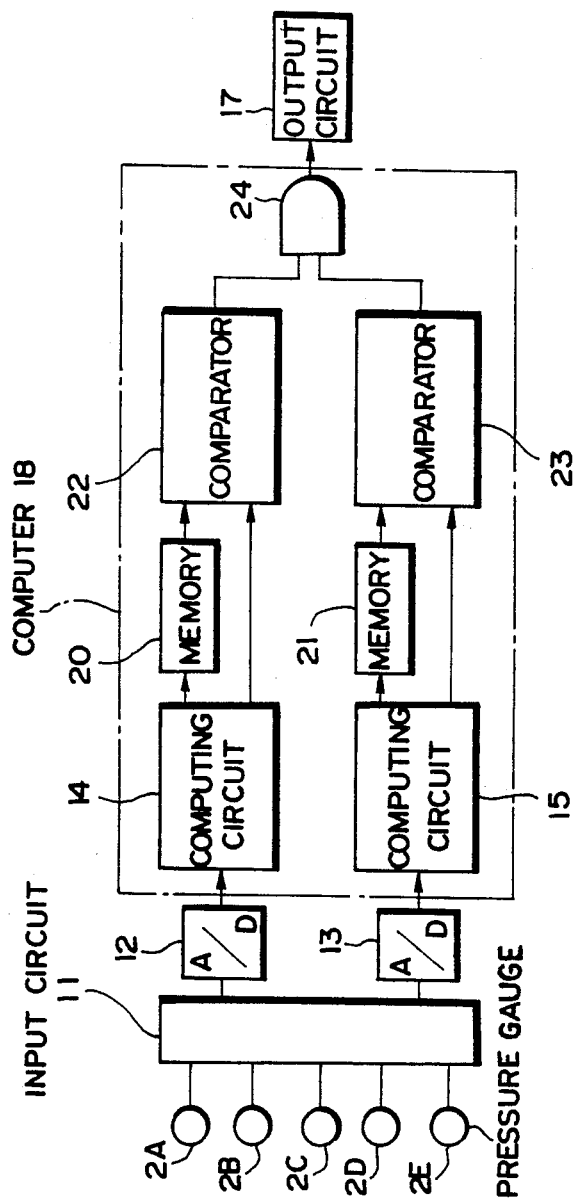
FIG. 10 is a block diagram showing another embodiment of the gas leak detecting apparatus according to the invention.

FIG. 10 is a block diagram of a gas leak detecting apparatus according to another embodiment of the invention. This apparatus differs from the apparatus of FIG. 9 in that memories 20 and 21, comparators 22 and 23 and an AND circuit 24 are additionally provided and the comparator 16 is eliminated. The memories 20 and 21 store, respectively, the pressure gradients at any given time which were computed by the computing circuits 14 and 15. The comparators 22 and 23 obtain, respectively, the difference between the pressure gradients at the given time applied from the memories 20 and 21, respectively, and the pressure gradients after a predetermined elapsed time applied from the computing circuits 14 and 15, respectively. The AND circuit 24 obtains the logical sum of the outputs from the comparators 22 and 23 thereby determining the presence or absence of a gas leak.

The operation of this gas leak detecting apparatus will now be described.

Firstly, the memories 20 and 21 store the pressure gradients at any given time in the gas pipe line 1.

The pressure gages 2A to 2E are respectively arranged at measuring points $S_1$ to $S_5$ in the gas pipe line 1, and the input circuit 11 selects the measuring points in any given section, e.g., the measuring points $S_1$ to $S_3$. Thus, the measured values of the pressures measured at the measuring points $S_1$ and $S_2$ at any given time by the pressure gages 2A and 2B are sent as analog signals to the A/D converter 12 from the input circuit 11, and also the measured values of the pressures measured simultaneously at the measuring points $S_2$ and $S_3$ by the pressure gages 2B and 2C are sent as analog signals to the other A/D converter 13 from the input circuit 11. The A/D converters 12 and 13 convert the analog signals to digital signals and send the digital signals to the computing circuits 14 and 15, respectively. The computing circuit 14 computes the pressure gradient between the measuring points $S_1$ and $S_2$ in accordance with the previously mentioned expression (1), and the other computing circuit 15 computes the pressure gradient between the points $S_2$ and $S_3$ in accordance with the expression (2). The pressure gradient values at the given time computed by the computing circuits 14 and 15 are respectively stored in the memories 20 and 21.

Then, after a predetermined elapsed time from the given time the current pressure gradients of the gas pipe line 1 are obtained and the differences between the pressure gradients at the given time and at the time after the predetermined elapsed time are obtained, thereby determining the presence or absence of a gas leak.

More specifically, the input circuit 11 selects the measuring points $S_1$ to $S_3$ in the given section of the gas pipe line 1 after the predetermined elapsed time from the given time. At this time, if there is a gas leak at the point $S_2$ of the measuring points $S_1$ to $S_3$, the measured values of the pressures at the measuring points $S_1$ and $S_2$, after the predetermined elapsed time in the gas leaky condition, are sent as analog signals to the A/D converter 12 from the pressure pages 2A and 2B through the input circuit 11, and simultaneously the measured values of the pressure measured at the measuring points $S_2$ and $S_3$ by the pressure gages 2B and 2C are sent as analog signals to the other A/D converter 13 from the input circuit 11. When this occurs, in the like manner as mentioned previously, the pressure gradient between the measuring points $S_1$ and $S_2$ after the predetermined elapsed time is computed by the computing circuit 14, and the similar pressure gradient between the measuring points $S_2$ and $S_3$ is computed by the other computing circuit 15. Then, the computed pressure gradient values after the predetermined elapsed time in the gas leaky condition from the computing circuits 14 and 15 and the pressure gradient values at the given time stored in the memories 20 and 21 are sent to the corresponding comparators 22 and 23. The comparator 22, connected to the computing circuit 14 and the memory 20, detects by comparison the difference between the pressure gradients between the measuring points $S_1$ and $S_2$ at the given time and after the predetermined elapsed time, respectively, in accordance with the previously mentioned expression (4). The other comparator 23, connected to the computing circuit 15 and the memory 21, detects by comparison the difference between the pressure gradients between the measuring points $S_2$ and $S_3$ at the given time and after the predetermined elapsed time, respectively, in accordance with the expression (5). When the pressure gradient difference detected by the comparator 22 is smaller than the value of $A_2$ and the pressure gradient difference detected by the other comparator 23 is greater than or equal to the value of $A_3$, the AND circuit 24 generates an output in response to the input signals from the comparators 22 and 23. In other words, the AND circuit 24 determines the occurrence of a gas leak. As a result, the output of the AND circuit 24 is sent as a leakage signal to the output circuit 17. The output circuit 17 generates a signal which indicates the presence or absence of a leak to the outside and this indication signal is displayed on a suitable display.

While, in this embodiment, the measuring points in the given section are limited to the points $S_1$ to $S_3$, it is of course possible to arrange the gas leak detecting apparatus of FIG. 10 so that the input circuit 11 suitably select for example the points $S_2$ to $S_4$, $S_3$ to $S_5$, $S_1$, $S_3$ or $S_5$ as the measuring point of any given section, thereby detecting a gas leak in the given section of the gas pipe line 1.

Further, in the embodiments of FIGS. 9 and 10 the measured values of the pressure gages in each of the sections may be read at predetermined intervals by the input circuit 11, thereby continuously monitoring the gas pipe line over its whole extent for the purpose of leak detection. In such a case, the input circuit 11 must be adapted so that it serves a a multiplexer.

What is claimed is:

1. A leak detecting apparatus for a gas pipe line comprising:
    a plurality of pressure gages arranged at predetermined intervals on a gas pipe line;
    an input circuit for receiving measured values of said pressure gages;
    a first computing circuit for computing a pressure gradient from measured values measured by upstream two of said pressure gages included in any given section of said gas pipe line selected by said input circuit;
    a second computing circuit for computing a pressure gradient from measured values measured by downstream two of said pressure gages included in said given section; and
    a comparator for comparing said pressure gradients computed by said first and second computing circuits such that the occurrence of a gas leak is determined when a difference between said upstream and downstream pressure gradient is greater than a predetermined value.

2. A leak detecting apparatus for a gas pipe line comprising:
a plurality of pressure gages arranged at predetermined intervalks on a gas pipe line;
an input circuit for receiving measured values of said pressure gages;
a first computing circuit for computing a pressure gradient at any given time and a pressure gradient at a time after a predetermined elapsed time from said given time in an upstream part of any given section of said gas pipe line selected by said input circuit;
a first memory for storing said pressure gradient at said given time computed by said first computing circuit;
a second computing circuit for computing a pressure gradient at said given time and a pressure gradient at said time after a predetermined elapsed time in a downstream part of said given section;
a second memory for storing said pressure gradient at said given time computed by said second computing circuit;
a first comparator for comparing said pressure gradient at said given time stored in said first memory and said pressure gradient at said time after a predetermined elapsed time computed by said first computing circuit;
a second comparator for comparing said pressure gradient at said given time stored in said second memory and said pressure gradient at said time after a predetermined elapsed time computed by said second computing circuit; and
and AND circuit for determining the occurrence of a gas leak and generating an output signal when a pressure gradient difference produced by said first comparator is smaller than a predetermined value and a pressure gradient difference produced by said second comparator is greater than a predetermined value.

3. A method of detecting leaks in a gas pipe line includig a plurality of pressure gages at predetermined spaced intervals along the pipe line to measure the gas pressure within the pipe line at the respective spaced intervals, said method comprising:

(a) measuring the gas pressure at least three of a plurality of pressure gages arranged at predetermined intervals on said gas pipe line;
(b) calculating a pressure gradient in each of an upstream and a downstream part of the gas pipe line between the at least three pressure gages on the basis of the measured gas pressures;
(c) determining the pressure gradient difference between the calculated pressure gradient in the upstream part and the calculated pressure gradient in the downstream part; and
(d) comparing the pressure gradient difference with a predetermined standard value and producing a gas leak signal when the former is greater than the latter.

4. A method of detecting leaks in a gas pipe line including a plurality of pressure gages at predetermined spaced intervals along the pipe line to measure the gas pressure whithin the pipe line at the respective spaced intervals, said method comprising:

(a) measuring the gas pressure at least three of a plurality of pressure gages arranged at predetermined intervals on said gas pipe line;
(b) calculating a first pressure gradient in each of an upstream and a downstream part of the gas pipe line between the at least three pressure gages on the basis of the measured gas pressures;
(c) measuring the gas pressure at said at least three of a plurality of pressure gages arranged at predetermined intervals on said gas pipe line after the passage of a predetermined time interval;
(d) calculating a second pressure gradient in each of an upstream and a downstream part of the gas pipe line between the at least three pressure gages on the basis of the measured gas pressures after the passage of a predetermined time interval;
(e) determining the upstream pressure gradient difference between the calculated first and second pressure gradients in the upstream part;
(f) determining the downstraem pressure gradient difference between the first and second pressure gradients in the downstream part; and
(g) producing a gas leak signal when the upstream pressure gradient difference is smaller than a first predetermined standard value and the downstream pressure gradient difference is equal to or greater than a second predetermined standard value.

* * * * *